US011434179B2

(12) United States Patent
Shirsat et al.

(10) Patent No.: US 11,434,179 B2
(45) Date of Patent: Sep. 6, 2022

(54) FERTILIZER COMBINATIONS

(71) Applicant: UPL LTD, Haldia (IN)

(72) Inventors: Rajan Ramakant Shirsat, Mumbai (IN); Talati Paresh Vithaldas, Mumbai (IN); Jaidev Rajnikant Shroff, Dubai (AE); Vikram Rajnikant Shroff, Dubai (AE)

(73) Assignee: UPL LTD, Haldia (IN)

( * ) Notice: Subject to any disclaimer, the term of this patent is extended or adjusted under 35 U.S.C. 154(b) by 0 days.

(21) Appl. No.: 16/969,644

(22) PCT Filed: Jan. 19, 2019

(86) PCT No.: PCT/IB2019/050455
§ 371 (c)(1),
(2) Date: Aug. 13, 2020

(87) PCT Pub. No.: WO2019/162770
PCT Pub. Date: Aug. 29, 2019

(65) Prior Publication Data

US 2021/0206700 A1 Jul. 8, 2021

(30) Foreign Application Priority Data

Feb. 22, 2018 (IN) ............................. 201831006799

(51) Int. Cl.

| | |
|---|---|
| ***C05G 5/30*** | (2020.01) |
| ***C05G 5/12*** | (2020.01) |
| ***C05G 3/40*** | (2020.01) |
| ***C05C 1/00*** | (2006.01) |
| ***C05C 9/00*** | (2006.01) |
| ***C05D 1/00*** | (2006.01) |
| ***C05C 3/00*** | (2006.01) |

(52) U.S. Cl.
CPC .................. *C05G 5/37* (2020.02); *C05C 1/00* (2013.01); *C05C 3/005* (2013.01); *C05C 9/00* (2013.01); *C05C 9/005* (2013.01); *C05D 1/00* (2013.01); *C05G 3/44* (2020.02); *C05G 5/12* (2020.02)

(58) Field of Classification Search
None
See application file for complete search history.

(56) References Cited

U.S. PATENT DOCUMENTS

| | | | | |
|---|---|---|---|---|
| 9,688,586 | B1 * | 6/2017 | Roa-Espinosa | C05C 9/005 |
| 2008/0294132 | A1 * | 11/2008 | Tan | A61L 15/225 604/360 |
| 2012/0198898 | A1 | 8/2012 | Fujii et al. | |
| 2012/0231171 | A1 * | 9/2012 | Roa-Espinosa | C05G 5/16 427/385.5 |
| 2012/0277099 | A1 * | 11/2012 | Olson | C09D 5/14 47/57.6 |
| 2013/0039965 | A1 | 2/2013 | Fujii et al. | |
| 2013/0312470 | A1 * | 11/2013 | Roa-Espinosa | C05B 7/00 71/23 |
| 2016/0340266 | A1 * | 11/2016 | Jablon | C05C 3/005 |
| 2017/0008818 | A1 | 1/2017 | Hermitte et al. | |
| 2017/0088480 | A1 * | 3/2017 | Kannan | C05G 5/37 |
| 2017/0112050 | A1 * | 4/2017 | Borody | A01C 21/005 |
| 2017/0238546 | A1 * | 8/2017 | Teeranitayatarn | C05D 3/00 |

FOREIGN PATENT DOCUMENTS

| | | | |
|---|---|---|---|
| CN | 1587211 | A | 9/2004 |
| CN | 102424640 | A | 9/2011 |
| CN | 104860751 | A | 5/2015 |
| WO | 2016162783 | A1 | 10/2016 |

OTHER PUBLICATIONS

International Search Report and Written Opinion for International Application PCT/IB2019/050455; International Filing dated Jan. 19, 2019; Date of Mailing: Mar. 29, 2019; 11 pages.

* cited by examiner

*Primary Examiner* — Wayne A Langel
(74) *Attorney, Agent, or Firm* — Cantor Colburn LLP

(57) ABSTRACT

Disclosed herein is a composition comprising fertilizer particles being coated with at least two layers of superabsorbent polymers such that leachate of nitrogen in the soil is substantially decreased.

10 Claims, No Drawings

FERTILIZER COMBINATIONS

CROSS REFERENCE TO RELATED APPLICATIONS

This application is a National Stage application of PCT/IB2019/050455, filed Jan. 19, 2019, which claims the benefit of Indian Application No. 201831006799, filed Feb. 22, 2018, both of which are incorporated by reference in their entirety herein.

TECHNICAL FIELD OF THE INVENTION

The present invention relates to compositions containing nitrogen fertilizers. More specifically, the present invention relates to compositions of nitrogen fertilizers, and methods of improving nitrogen retention in the rhizosphere of the soil.

BACKGROUND AND PRIOR ART

Fertilizers are essential in the growth and improved yield of the crops. However, increased use of fertilizers has led to contamination of the soil. Fertilizer that are leached below the rootzone of the crops are considered lost till the roots reach further below or if there is ground water below, fertilizer leachate can cause groundwater contamination. The runoff, specially in high agricultural areas that border on water sources and rivers sometimes see increased weed activity due to increased availability of unwanted fertilizers.

Superabsorbent polymers are known in the art. Researchers have been known to combine fertilizers and superabsorbent polymers to maximize the effect of the fertilizer and the water retention and release capacity of superabsorbent polymers. Qiao et. al. Preparation and characterization of slow-release fertilizer encapsulated by starch-based superabsorbent polymer, Carbohydrate Polymers 147 (2016) 146-154 teach the preparation of coated urea, wherein urea is first coated with ethyl cellulose and then a layer of superabsorbent polymer was added over the ethyl cellulose. Although the release profile is said to be slow release, the preparation of such a composition would require heat to melt the ethyl cellulose. Moreover, the temperature sensitive ethyl cellulose would not coat the urea granules uniformly thereby causing uneven coating.

Another problem encountered when mixing fertilizers with superabsorbent polymers is the decrease in the superabsorbent polymers capacity to absorb water, specifically when higher amounts of fertilizers are combined with superabsorbent polymers. This is primarily because of the ionic fertilizer moieties taking up the space that would otherwise have been occupied by water. There is a therefore, a need in the art for an evenly coated urea composition that can prevent the leachate from escaping into the soil, while making it available to the plants for a longer amount of time. There is also a need in the art for such a composition of fertilizers and superabsorbent polymers that maintain the same level of absorbency when combined with a high load of fertilizer.

OBJECT OF THE INVENTION

Thus, one advantage of the present invention is providing a fertilizer composition that has a high load of fertilizer, with minimal amount of leachate.

Another advantage of the present invention is in providing a composition having enhanced water absorption capacity.

Another advantage of the present invention is maintaining a substantially high level of nitrogen in the rhizosphere.

These and other advantages may be achieved by the invention described in any aspect or embodiment hereinafter.

SUMMARY OF THE INVENTION

A composition comprising fertilizer particles, said fertilizer particles being coated with at least two layers of superabsorbent polymers.

A method of delivering nitrogen to the soil, said method comprising applying, to the soil or a plant or to the soil and a plant, a composition comprising fertilizer particles, said fertilizer particles being coated with at least two layers of superabsorbent polymers.

A method of maintaining a constant source of nitrogen or increasing the nitrogen content in the rhizosphere, said method comprising applying, to the soil or a plant or to the soil and a plant, a composition comprising fertilizer particles, said fertilizer particles being coated with at least two layers of superabsorbent polymers.

A method of fertilizing a plant, said method comprising applying to the plant or the soil or to the plant and the soil, a composition comprising fertilizer particles, said fertilizer particles being coated with at least two layers of superabsorbent polymers.

A method of promoting crop production, the method comprising applying, to the soil or a plant or to the soil and the plant, a composition comprising fertilizer particles, said fertilizer particles being coated with at least two layers of superabsorbent polymers.

A method comprising applying to a plant or to the soil or to a plant and the soil, a composition comprising fertilizer particles, said fertilizer particles being coated with at least two layers of superabsorbent polymers.

A multi-pack agricultural product comprising:

a first container comprising at least one superabsorbent polymer;

a second container comprising at least one fertilizer; and an instruction manual instructing a user to admix the contents of said first and second container and administering the admixture to a plant or the soil or to a plant and the soil.

A method of preparing a fertilizer composition, said method comprising:

a. charging a coating machine with a fertilizer;
b. charging the coating machine with a first superabsorbent polymer slurry;
c. mixing the fertilizer and the first superabsorbent polymer slurry;
d. charging the coating machine with a second superabsorbent polymer in a dry form;
e. mixing the coated fertilizer and the second dry superabsorbent polymer to obtain the dual coated fertilizer; and
f. drying the thus coated fertilizer.

DETAILED DESCRIPTION

Within the context of this specification, each term or phrase below will include the following meaning or meanings:

The term “nitrogen leachate” is defined as the mass of nitrogen drained through the soil and below the plant root zone. The term “rhizosphere” is defined as the narrow region of soil that is directly influenced by root secretions and associated soil microorganisms. The terms “superabsorbent polymer" or "SAP" or "polymer gel" refer to water swellable polymers that can absorb water many times their weight in an aqueous solution. Without wishing to be bound by theory, the term superabsorbent polymers also apply to polymers that absorb water as well as de-sorb the absorbed water. The superabsorbent polymer may be selected from but not limited to water-swellable or water absorbing or water-retentive polymers such as cross-linked polymers that swell without dissolving in the presence of water, and may, absorb at least 10, 100, 1000, or more times their weight in water. The phrases "at least one" means "one or more", "at least" followed by a numerical value means "this or a higher numerical value". The term "locus" means the area in which the plants are growing or will grow. The term "substantially" means at least a minimum of 30% to 100% nitrogen fertilizer available in the rhizosphere.

It has surprisingly been found by the present inventors that, coating nitrogen fertilizers such as urea with multiple layers of superabsorbent polymers resulted in a substantial reduction in nitrogen leaching into the soil.

Thus, an aspect of the present invention may provide a composition comprising fertilizer particles, said fertilizer particles being coated with at least two layers of superabsorbent polymers.

In an embodiment, the composition is characterized by substantially decreased nitrogen leachate at the locus.

Thus, in an embodiment, the present invention may provide a fertilizer composition comprising fertilizer particles coated with a first layer of superabsorbent polymer and a second layer of superabsorbent polymer, wherein the two superabsorbent polymer layers may comprise same or different class of polymers, such that the leachate of nitrogen in the soil is substantially decreased.

In an embodiment, the fertilizer may be a nitrogen supplying fertilizer.

The nitrogen supplying fertilizer may be selected from but not limited to ammonium sulphate, urea, ammonium chloride, calcium ammonium nitrate, anhydrous ammonia or combination products such as urea combined with potash fertilizers such diammonium phosphate, single superphosphate, ammonium phosphate sulphate, ammonium phosphate sulphate nitrate, urea ammonium phosphate, mono ammonium phosphate, diammonium phosphate, nitrophosphate, ammonium nitrate phosphate, ammonium phosphate zincated urea, zincated NPK, NPK fertilizers or combination thereof.

In an embodiment, composition of the present invention may contain nitrogen containing fertilizer in an amount of up to 98%, preferably up to 95%, most preferably up to between 60 to 90%.

In a preferred embodiment, the nitrogen fertilizer is urea or mono ammonium phosphate or diammonium phosphate.

Without wishing to be bound by theory, it is believed that contacting the fertilizer with at least two layers of superabsorbent polymer results in a steady release of the nitrogen fertilizer or nitrate into the soil. The problem faced by formulators is the decrease in water absorbance, when superabsorbent polymers are mixed with fertilizers. Many researchers have used coating polymers or binders such as polyethylene glycol, ethylene glycol etc. These binders have not had the desired effect of completely coating the fertilizers. In some cases, the heat causes the binder to melt and fuse with the fertilizer causing further problems faced particularly during scale up. Another method known in the art, is coating the fertilizer granules with silica and binding agent such as mineral oil or paraffin oil, this method results in unevenly coated granules and quick release of fertilizer that results in leachate leaking into the soil and surrounding environs. As will be demonstrated in the examples, the use of at least two layers of superabsorbent polymer results in an evenly coated fertilizer that allows for a steady release of nitrogen fertilizer into the rhizosphere, such that there is substantially less leachate as compared to non-coated urea, as well as other coated compositions known in the art.

The present inventors also believe that the use of such a dual coated fertilizer has surprisingly resulted in a steady release of water and nitrogen containing fertilizer to the rhizosphere, resulting in improved and early root and shoot elongation, as well as improved yield.

Thus, in an embodiment, the superabsorbent polymer may be selected from, but not limited to, copolymer of acrylamide and sodium acrylate; hydrolyzed starch-polyacrylonitrile; 2-propenenitrile homopolymer, hydrolyzed, sodium salt; or poly(acrylamide co-sodium acrylate) or poly(2-propenamide-co-2-propanoic acid, sodium salt); starch-g-poly(2propenamide-co-2-propanoic acid, mixed sodium and aluminum salts); starch-g-poly(2-propenamide-co-2-propanoic acid, potassium salt); poly(2-propenamide-co-2-propanoic acid, sodium salt); poly-2-propanoic acid, sodium salt; starch-gpoly(acrylonitrile) or poly(2-propenamide-co-sodium acrylate); starch/acrylonitrile copolymer; cross-linked copolymers of acrylamide and sodium acrylate; acrylamide/sodium polyacrylate crosslinked polymers; anionic polyacrylamide; starch grafted sodium polyacrylates; acrylic acid polymers, sodium salt; crosslinked potassium polyacrylate/polyacrylamide copolymers; sodium polyacrylate; superabsorbent polymer laminates and composites; partial sodium salt of crosslinked polypropenoic acid; potassium polyacrylate, lightly crosslinked; sodium polyacrylate, lightly crosslinked; sodium polyacrylates; poly(sodiumacrylate) homopolymer; polyacrylamide polymers, carrageenan, agar, alginic acid, guar gums and its derivatives, and gellan gum; crosslinked polymers made from carrageenan, cassava.

In a preferred embodiment, the superabsorbent polymer may be starch-g-poly (2-propenamide-co-2-propenoic acid) potassium salt or crosslinked polyacrylic acid potassium salt.

In an embodiment, the two superabsorbent polymer coating layers may comprise preferably the same superabsorbent polymer. In an embodiment, the superabsorbent polymer coating layers may comprise two different superabsorbent polymers. In an embodiment, the coating of superabsorbent polymers may be at least two layers of the superabsorbent polymers and not more than four layers of the superabsorbent polymer.

In an embodiment, the first coating of superabsorbent polymer may contain about 0.1 to about 10%, more specifically about 0.5% of superabsorbent polymer per at least 85-98 kg of nitrogen fertilizer to be coated. In an embodiment, the superabsorbent polymer may be prepared in a slurry form, wherein the slurry maybe prepared using solvents such as polar solvents.

In a preferred embodiment, the polar solvent may be water. A person skilled in the art, may readily increase and or decrease the quantity of superabsorbent polymer based on the quantity of nitrogen fertilizer to be coated.

In an embodiment, the second coating of superabsorbent polymer may be a dry powder or granular form in a quantity of about 1 to 150 gms per kg of the superabsorbent polymer having particle size of about 0.1 to 150 microns.

In another embodiment, the present invention provides a composition comprising coated nitrogen containing fertilizer particles coated with a first layer of superabsorbent polymer selected from starch-g-poly (2-propenamide-co-2-propenoic acid) potassium salt polymer and at least a second layer of superabsorbent polymer starch-g-poly (2-propenamide-co-2-propenoic acid) potassium salt polymer such that the leachate of nitrogen in the soil is substantially decreased.

In an embodiment, the rate of application of the composition of the present invention may be 50 to 400 kg/ha, more preferably between 100 to 300 kg/ha, most preferably between 125 to 250 kg/ha. The decrease in the loss of leachate into the soil results in the reduction of the amount of nitrogen fertilizer to be used. This is a distinct advantage over normal urea, decreasing cost and improving plant health without damaging the environment.

The composition of the present invention may be used on a variety of crops such as corn, rice, wheat, barley, rye, oat, sorghum, cotton, soybean, peanut, buckwheat, beet, rapeseed, sunflower, sugar cane, tobacco, etc.; vegetables: solanaceous vegetables such as eggplant, tomato, pimento, pepper, potato, etc., cucurbit vegetables such as cucumber, pumpkin, zucchini, water melon, melon, squash, etc., cruciferous vegetables such as radish, white turnip, horseradish, kohlrabi, Chinese cabbage, cabbage, leaf mustard, broccoli, cauliflower, etc., asteraceous vegetables such as burdock, crown daisy, artichoke, lettuce, etc, liliaceous vegetables such as green onion, onion, garlic, and asparagus, ammiaceous vegetables such as carrot, parsley, celery, parsnip, etc., chenopodiaceous vegetables such as spinach, Swiss chard, etc., lamiaceous vegetables such as *Perilla frutescens*, mint, basil, etc, strawberry, sweet potato, *Dioscorea japonica, colocasia*, etc., flowers, foliage plants, turf grasses, fruits: pome fruits such apple, pear, quince, etc, stone fleshy fruits such as peach, plum, nectarine, *Prunus mume*, cherry fruit, apricot, prune, etc., citrus fruits such as orange, lemon, rime, grapefruit, etc., nuts such as chestnuts, walnuts, hazelnuts, almond, pistachio, cashew nuts, macadamia nuts, etc. berries such as blueberry, cranberry, blackberry, raspberry, etc., vines, kaki fruit, olive, plum, banana, oil palm, coffee, date palm, coconuts, etc., trees other than fruit trees; tea, mulberry, flowering plant, boarder plants, trees such as ash, birch, dogwood, Eucalyptus, Ginkgo biloba, lilac, maple, Quercus, poplar, Judas tree, *Liquidambar formosana*, plane tree, zelkova, Japanese arborvitae, fir wood, hemlock, juniper, *Pinus, Picea*, and *Taxus* cuspidate etc.

The compositions of the present invention may be used in gardens, turf or nursery pots.

An aspect of the present invention may provide a process for preparing a coated nitrogen fertilizer, said method comprising:

a. charging a coating machine with fertilizer;
b. charging the coating machine with a first superabsorbent polymer slurry;
c. mixing the fertilizer and the first superabsorbent polymer slurry;
d. charging the coating machine with a second superabsorbent polymer in a dry form;
e. mixing the coated fertilizer and the second superabsorbent polymer to obtain dual coated fertilizer;
f. optionally repeating steps c and d; and
g. drying the coated fertilizer.

Thus, in an embodiment, the present invention provides a process for preparing a coated nitrogen fertilizer composition comprising at least two superabsorbent polymers wherein, the superabsorbent polymer is the same or different, for example, the first superabsorbent polymer may be a polyacrylamide based superabsorbent polymer, and the second may be a starch graft superabsorbent polymer, or the first super absorbent polymer may be cassava cross linked polymer and the second polymer may be a cellulose cross linked polymer.

In an embodiment, the drying may be carried out at a temperature between 40 to 120 preferably between 60 to 80 degrees Celsius.

It has been further found by the present inventors that the compositions of the present invention may be used to deliver a constant supply of nitrogen containing fertilizer such that there is substantially decreased nitrogen leachate beyond the rhizosphere. The term "beyond the rhizosphere" may be defined as an area depending on plant species, as the 2 to 80 mm away from the roots. Thus, an area beyond the rhizosphere would be beyond 80 mm of the roots.

The compositions of the present invention may find use in a variety of methods according to the present invention. These methods may include method of delivering nitrogen to the soil, method of maintaining a constant source of nitrogen or increasing the nitrogen content in the rhizosphere, method of fertilizing a plant, method of promoting crop production, and a method for applying the composition to a plant or to the soil or to a plant and the soil.

Thus, in an embodiment, the present invention provides a method of delivering nitrogen to the soil, said method comprising applying, to the soil or a plant or to the soil and a plant, a composition comprising fertilizer particles, said fertilizer particles being coated with at least two layers of superabsorbent polymers.

In another embodiment, the present invention provides a method of maintaining a constant source of nitrogen or increasing the nitrogen content in the rhizosphere, said method comprising applying, to the soil or a plant or to the soil and a plant, a composition comprising fertilizer particles, said fertilizer particles being coated with at least two layers of superabsorbent polymers.

In yet another embodiment, the present invention provides a method of fertilizing a plant, said method comprising applying to the plant or the soil or to the plant and the soil, a composition comprising fertilizer particles, said fertilizer particles being coated with at least two layers of superabsorbent polymers.

In another embodiment, the present invention provides a method of promoting crop production, the method comprising applying, to the soil or a plant or to the soil and the plant, a composition comprising fertilizer particles, said fertilizer particles being coated with at least two layers of superabsorbent polymers.

In another embodiment, the present invention provides a method comprising applying to a plant or to the soil or to a plant and the soil, a composition comprising fertilizer particles, said fertilizer particles being coated with at least two layers of superabsorbent polymers.

In an embodiment, these method embodiments described herein are characterized by the fertilizer composition having a substantially decreased nitrogen leachate beyond the rhizosphere and a substantially increased nitrogen availability in the vicinity of the roots.

As will be demonstrated in the examples, the composition of the present invention prevents leaching of nitrates into the soil beyond the rhizosphere, thereby making the fertilizer available to the plant as it grows and the root zone expands and therefore the rhizosphere expands.

The inventors in the present invention have studied the levels of nitrogen in the soil and calculated the leaching potential of the composition in the soil, and found that leachate was highest in the rhizosphere and decreased in the lower levels of the soil. The inventors have also studied the percentage loss of urea in the present invention and the compared it uncoated urea and found some surprising results.

Thus, another aspect of the present invention may provide a method of maintaining a constant source of nitrogen in the rhizosphere, said method comprising applying a composition of nitrogen fertilizer, such the said composition is characterized by substantially decreased nitrogen leachate at the locus.

In an embodiment, the composition of the present invention may be mixed with other plant advantageous additives selected from fertilizers, mycorrhiza, micronutrients, acaricides, algicides, antifeedants, avicides, bactericides, bird repellents, chemosterilants, fungicides, herbicide safeners, herbicides, insect attractants, insect repellents, insecticides, mammal repellents, mating disruptors, molluscicides, nematicides, plant activators, plant-growth regulators, rodenticides, synergists, virucides, derivatives thereof, biological control agents and mixtures thereof.

In an embodiment, the fertilizer may be selected from organic and inorganic fertilizers such as those selected from but not limited phosphate, calcium, potassium, magnesium, sulfur, copper, iron, manganese, molybdenum, zinc, nickel, cobalt, boron and their salts and derivatives. Exemplary organic fertilizer may be selected from peat, limestone, rock phosphate, blood meal, bone meal, compost, humic acid, seaweed extracts, digested proteins, fish meal, feather meal, corn meal, alfalfa meal etc.

In an aspect, the composition may additionally comprise mycorrhiza, micronutrients including but not limited to amino acids and other agronomically advantageous plant additives thereof.

Further additives such as inert fillers, binding agents, surfactants, dispersing agents and the like may be added to the composition of the present invention.

In an embodiment, the inert fillers and/or binding agents may be selected from but not limited to kaolin, sucrose, lactose, mineral earths and clays such as bentonite, perlite, talc, kaolin, aluminum silicate, diatomaceous earth, attapulgite, clay, barium sulfate, mica, zeolites, calcium carbonate, fused sodium potassium, precipitated silica, precipitated silicates, aluminum silicate, sodium citrate, potassium citrate and magnesium citrate.

In an embodiment, the fertilizer particles of the present invention may additionally be coated with mineral oil. It is believed that the additional mineral oil coating is provided to prevent inclusion of atmospheric moisture into the coated granules and yet retain the water absorbance capacity.

The improved composition of the present invention may be applied in granular form, or in the form of pellets or prills or any other form.

In an embodiment, the finished composition may be treated with inert oil such as paraffin oil, mineral oil, soybean oil, castor oil, or any other such inert oil.

The composition of the present invention may be applied to soil, root, seed, or seedling by various methods, including, but not limited to broadcasting, dipping the plant, root, seed, or seedling into the superabsorbent polymer composition, a slurry of the superabsorbent polymer composition, or a paste including the superabsorbent polymer composition of the invention; mixing another plant growth media with the superabsorbent polymer composition and later planting a plant, root, seed, or seedling into the plant growth media comprising the superabsorbent polymer composition of the invention; or forming a slurry of the superabsorbent polymer composition that is applied directly to the growing substrate.

In an embodiment, the composition of the present invention may be applied to the root zone of the plant.

In an embodiment, the present invention provides a method for improving the yield of a crop by applying the composition of the invention to plant propagation material selected from, but not limited to seeds, plant propagules such as suckers, corms, bulbs, fruit, tubers, grains, cuttings and cut shoots.

In an aspect, composition of the present invention may be packaged as a kit-of-parts which facilitates the mixing of a nitrogen containing fertilizer and at least two superabsorbent polymers.

Therefore, in this aspect, the present invention provides a multi-pack agricultural product comprising:

a first container comprising at least one superabsorbent polymer;

a second container comprising at least a nitrogen supplying fertilizer; and an instruction manual instructing a user to admix the contents of said first and second container and administering the admixture to a locus.

In an embodiment, the multi-pack product may comprise a nitrogen fertilizer or blends of nitrogen fertilizers or blends of other fertilizer with nitrogen fertilizers or blends of nitrogen fertilizer with other agronomically advantageous plant additives.

The advantages offered by the present invention will be more apparent from the examples set forth herein below. These examples are provided merely as illustrations of the invention and are not intended to be construed as a limitation thereof.

EXAMPLES

Example 1

Superabsorbent polymer coated nitrogen fertilizer was prepared using the following process:

To a starch based superabsorbent polymer such as a cross linked acrylamide and starch polymer, a required quantity of distilled water was added. The slurry was added to a mixing vessel containing urea. The slurry and the urea were mixed together, to ensure even coating of the superabsorbent polymer on the urea. A dry powder form of the same starch based superabsorbent polymer was then added to the mixing vessel adding a second layer of superabsorbent polymer, which was mixed for more even coating. The coated particles were then dried using a blower.

Comparative Example 2

Superabsorbent polymer coated nitrogen fertilizer was prepared using the following process:

Urea was charged in a mixing vessel and hot water was circulated outside the vessel to maintain the temperature between 80-85° C., making the outside surface of the urea granules oily, charging the superabsorbent polymer and mineral oil and mixing. Charging the mixer with precipitated silica and SAP and cooling the product.

Comparative Example 3

Superabsorbent polymer and binder coated nitrogen fertilizer was prepared using the following process:

Urea was charged in a mixing vessel and hot water was circulated outside the vessel to maintain the temperature between 80-85° C., making the outside surface of the urea granules oily, charging the mixing vessel with polyethylene glycol and SAP and mixing. Adding a starch based super-absorbent polymer and cooling the product.

Example 4

A column study was carried out for studying the amount of leachate in the soil. For the purpose of the study coated nitrogen fertilizer was prepared using the process described in example 1. Samples were prepared with concentrations of 10% (Sample A) and 6% (Sample B) of superabsorbent polymer coated onto nitrogen fertilizer. An uncoated urea fertilizer was used as a comparative example or the compositions prepared according to examples 2 and 3. The study was carried using OECD guidelines and the amount of nitrogen was calculated using Kjeldahl method wherein the concentration of nitrogen in the leachate was calculated using the following formula:
Distance travelled in soil is calculated by following formula:

$$\text{Per centimeter concentration of test substance (in mg)} = \frac{\text{total substance recovered from column in mg}}{\text{Length of column in cm}}$$

Table 1 demonstrates the amount of leachate for various concentrations of urea and the amount of leachate at various depths of the soil.

TABLE 1

Summary Table

| Description | Soil column: Blank | UREA | Example 1 with 8% SAP | Example 1 with 10% SAP |
|---|---|---|---|---|
| Nitrogen found in -0 to 7.5 cm column segment (mg) | 16.17 | 17.72 | 25.13 | 32.39 |
| Nitrogen found in- 7.5 cm to 15 cm column segment (mg) | 17.44 | 26.98 | 25.36 | 34.56 |
| Nitrogen found in-15 cm to 22.5 cm column segment (mg) | 15.90 | 24.65 | 23.73 | 28.69 |
| Nitrogen found in-22.5 cm to 30 cm column segment (mg) | 18.45 | 43.19 | 20.21 | 19.29 |
| Nitrogen found in-Leachate (mg) | 06.92 | 14.72 | 07.34 | 05.34 |
| Total Nitrogen found in 30 cm soil segment & leachate (mg) | 73.97 | 127.27 | 101.78 | 120.26 |
| Total Nitrogen Quantity of Doped Nitrogen (mg) | 0 | 32.75 | 30.40 | 30.82 |
| Soil Nitrogen + Doped Nitrogen (mg) | 73.97 | 106.73 | 104.37 | 104.79 |
| Percentage recovery of Nitrogen (%) | — | 119.25 | 97.51 | 114.76 |
| Total Nitrogen hold up in 30 cm soil depth (mg) | 67.96 | 112.55 | 94.43 | 114.92 |
| Total Nitrogen hold up in 30 cm soil depth (%) | 91.86 | 88.43 | 92.78 | 95.55 |
| Percentage of total Nitrogen in Leachate (%) | 8.13 | 11.56 | 7.21 | 4.44 |
| Concentration of Nitrogen per cm of column (mg/cm) | 2.27 | 3.75 | 3.15 | 3.83 |
| 50% quantity of recovered Nitrogen in (mg) | — | 63.64 | 50.89 | 60.13 |
| Distance in cm travel by 50% of recovered Nitrogen | — | 19.97 | 15.10 | 14.32 |
| Mobility factor for composition of Example-1 in comparison with Urea | — | 1.00 | 0.756 | 0.717 |

Conclusion

In this study, it was thus found that the leaching potential of nitrogen was surprisingly lesser in composition of example 1 with 10% SAP followed by the composition with 8% SAP in comparison with Urea. When measured up to the 30 cm depth of soil, 95.56% & 92.78% of Nitrogen was present when it was applied through the composition of example-1 with 10% SAP and with 8% SAP respectively; whereas, when it was applied through urea alone it was 88.43%.

Nitrogen in leachate was found less in composition of example-1 with 10% SAP (4.44%) and with 8% SAP (07.22%) in comparison with Urea (11.57%).

Mobility factor of Nitrogen in example-1 composition with 10% SAP is 0.717 and with 8% SAP is 0.756, considering the urea as a reference substance.

This shows that nitrogen is less leached in soil applied with composition of Example-1.

Table 1 thus clearly demonstrates the efficacy of sample A and sample B. The mobility of coated urea vs uncoated urea clearly shows a marked improvement in the thus coated urea. The amount of nitrogen in the leachate in percentage for samples A and B were almost half of the uncoated urea, while the total nitrogen content in the 30 cm column was the highest in coated urea, thereby demonstrating the efficacy of the coated urea in the release of nitrogen fertilizer in the rhizosphere.

The instant invention is more specifically explained by above examples. However, it should be understood that the scope of the present invention is not limited by the examples in any manner. It will be appreciated by any person skilled in this art that the present invention includes aforesaid examples and further can be modified and altered within the technical scope of the present invention.

The invention claimed is:

1. A composition comprising fertilizer particles, wherein said fertilizer particles are coated with a first and a second superabsorbent polymer layer, wherein the first superabsorbent polymer layer contains a nitrogen fertilizer and about 0.1 to about 10% of superabsorbent polymer per 85-98 kg of the nitrogen fertilizer, wherein the second superabsorbent polymer layer is in a dry powder or granular form in a quantity of 1 to 150 grams per kg of the superabsorbent polymer, the particles or granules having a particle size of 0.1 to 150 microns, and wherein the second layer is exterior to the first layer.

2. The composition as claimed in claim 1, wherein the first and second superabsorbent polymer layers comprise the same or a different class of polymers.

3. The composition as claimed in claim 1, wherein the fertilizer is a nitrogen supplying fertilizer selected from the group consisting of ammonium sulphate, urea, ammonium chloride, calcium ammonium nitrate, anhydrous ammonia urea combined with potash fertilizers selected from the group consisting of diammonium phosphate, single superphosphate, ammonium phosphate sulphate, ammonium phosphate sulphate nitrate, urea ammonium phosphate, mono ammonium phosphate, diammonium phosphate, nitrophosphate, ammonium nitrate phosphate, ammonium phosphate zincated urea, zincated NPK, NPK fertilizers; and combinations thereof.

4. The composition as claimed in claim 3, wherein the nitrogen supplying fertilizer is present in an amount of up to 98% by weight of the composition.

5. The composition as claimed in claim 1, wherein the superabsorbent polymer of one of the first and second layers is selected from the group consisting of copolymers of acrylamide and sodium acrylate; hydrolyzed starch-polyacrylonitrile; 2-propenenitrile homopolymer, hydrolyzed, sodium salt; poly(acrylamide co-sodium acrylate) or poly (2-propenamide-co-2-propanoic acid, sodium salt); starch-g-poly(2propenamide-co-2-propanoic acid, mixed sodium and aluminum salts); starch-g-poly(2-propenamide-co-2-propanoic acid, potassium salt); poly(2-propenamide-co-2-propanoic acid, sodium salt); poly-2-propanoic acid, sodium salt; starch-gpoly(acrylonitrile) or poly(2-propenamide-co-sodium acrylate); starch/acrylonitrile copolymer; crosslinked copolymers of acrylamide and sodium acrylate; acrylamide/sodium polyacrylate crosslinked polymers; anionic polyacrylamide; starch grafted sodium polyacrylates; acrylic acid polymers, sodium salt; crosslinked potassium polyacrylate/polyacrylamide copolymers; sodium polyacrylate; superabsorbent polymer laminates and composites; partial sodium salt of crosslinked polypropenoic acid; potassium polyacrylate, lightly crosslinked; sodium polyacrylate, lightly crosslinked; sodium polyacrylates; poly(sodiumacrylate) homopolymer; polyacrylamide polymers, carrageenan; agar; alginic acid; guar gums; gellan gum; a crosslinked polymers made from carrageenan polymer; and cassava.

6. The composition as claimed in claim 1, wherein the superabsorbent polymer of one of the first and second layers comprises starch-g-poly (2-propenamide-co-2-propenoic acid) potassium salt or crosslinked polyacrylic acid potassium salt.

7. The composition as claimed in claim 1, wherein the first and second superabsorbent polymer layers are of the same polymer or two different polymers.

8. The composition of claim 1, further comprising an inert oil selected from the group consisting of paraffin oil, mineral oil, soybean oil, castor oil, and combinations thereof.

9. A method of maintaining a constant source of nitrogen or increasing the nitrogen content in the rhizosphere, said method comprising applying, to soil, a plant or both, the composition of claim 1 wherein the nitrogen fertilizer is a nitrogen supplying fertilizer.

10. A process of preparing a fertilizer composition, said process comprising:

a. charging a coating machine with a nitrogen fertilizer;
b. charging the coating machine with a first superabsorbent polymer slurry;
c. mixing the nitrogen fertilizer and the first superabsorbent polymer slurry to form a coated fertilizer comprising a first superabsorbent polymer layer;
d. charging the coating machine with a second superabsorbent polymer in a dry form;
e. mixing the coated fertilizer and the second dry superabsorbent polymer to form fertilizer particles coated with the first and second superabsorbent polymer layers, wherein the second superabsorbent polymer layer is in a dry powder or granular form in a quantity 1 to 150 grams per kg per kg of the superabsorbent polymer, the particles or granules having a particle size of 0.1 to 150 microns; and
f. drying the fertilizer particles.

* * * * *